Patented Jan. 26, 1954

2,667,479

UNITED STATES PATENT OFFICE 2,667,479

BENZIMIDAZOLE PHOSPHATE

Dorothea Heyl Hoffman, Rahway, Clifford H. Shunk, Scotch Plains, and Karl Folkers, Plainfield, N. J., assignors to Merck & Co., Inc., Rahway, N. J., a corporation of New Jersey No Drawing. Application January 30, 1951, Serial No. 208,651

1 Claim. (Cl. 260—211.5)

This invention relates to the preparation of valuable derivatives of 5,6-dimethylbenzimidazole. Specifically, it relates to the preparation of a phosphate ester of 1-($\alpha$-D-ribofuranosido)-5,6-dimethylbenzimidazole which possesses growth promoting properties, and intermediate products and processes useful for preparing said growth promoting agent.

It has been found that when vitamin $B_{12}$ is hydrolyzed with acids there is obtained a mixture of cleavage products one of which has been identified as a phosphate of 1-($\alpha$-D-ribofuranosido)-5,6-dimethylbenzimidazole. This latter product possesses the biological properties of a vitamin and is similar in activity to another hydrolytic fragment, namely 1-($\alpha$-D-ribofuranosido)-5,6-dimethylbenzimidazole, which is described in the Journal of the American Chemical Society, vol 72, page 1806 (1950). However, in contrast to this compound the phosphate derivative is very soluble in water and may therefore be readily administered to animals in the drinking water as a source of the growth promoting agent. This method of administration is advantageous since it permits a more accurate and convenient control of the dosage being given than can be obtained by mixing a growth promoting agent with the feedstuff. Thus, this phosphate derivative of 1-($\alpha$-D-ribofuranosido)-5,6-dimethylbenzimidazole is an important and valuable compound.

It is therefore an object of this invention to provide a method for preparing this valuable compound and derivatives thereof. Another object is to provide valuable intermediate products which are readily converted to the phosphate derivative. Other objects will be apparent from the detailed description hereinafter provided.

Since 1-($\alpha$-D-ribofuranosido)-5,6-dimethylbenzimidazole contains hydroxyl groups in the 2', 3' and 5' positions, it is possible that the phosphate group may be substituted in any one of these positions. However, the 5'-phosphate derivative has been prepared and it was found that this derivative is much less active as a growth promoting agent than the phosphate derivative obtained by hydrolysis of vitamin $B_{12}$ or 1-($\alpha$-D-ribofuranosido)-5,6-dimethylbenzimidazole. Therefore, the phosphate group must be in either the 2' or 3' position.

In accordance with the process of this invention, a phosphate derivative of 1-($\alpha$-D-ribofuranosido)-5,6-dimethylbenzimidazole is obtained which is identical with the phosphate product obtained by hydrolytic cleavage of vitamin $B_{12}$.

The product obtained by our process which is believed to be either the 2' or 3' phosphate of 1-($\alpha$-D-ribofuranosido)-5,6-dimethylbenzimidazole represented by the formulae:

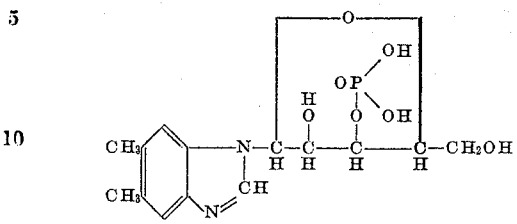

or is conveniently prepared by a 3-step process comprising converting 1-($\alpha$-D-ribofuranosido)-5,6-dimethylbenzimidazole to the corresponding 5'-trityl derivative, treating this compound with dibenzylchlorophosphonate to obtain a dibenzylphosphate of 1-(5'-trityl-$\alpha$-D-ribofuranosido)-5,6-dimethylbenzimidazole, and treating the latter reaction product with hydrogen in the presence of a hydrogenation catalyst to produce the desired compound.

Step 1 of our preferred process comprises the formation of the 5'-trityl derivative in order to protect the 5'-hydroxyl group prior to phosphorylation. The tritylation is conveniently effected by dissolving the 1-($\alpha$-D-ribofuranosido)-5,6-dimethylbenzimidazole in a tertiary organic base, such as pyridine and the like, and adding triphenylchloromethane to the reaction mixture. We have achieved excellent yields of the desired 5'-trityl compound by permitting the reaction mixture to stand at room temperature for about 17 hours, and then heating it at 100° C. for about 3 hours. Although the desired 5'-trityl derivative may be isolated by a number of alternative procedures, we have found it advantageous to pour the reaction mixture into water and then remove the supernatant liquor from the oil and gum which separates. The separated oil and gum may then be freed of residual pyridine by extraction with water. If desired, the product may be still further purified by dissolving the gummy material in an acetone-ethanol solution and treating the resulting solution with activated charcoal. After removing the charcoal, concentration of the resulting solution to dryness under reduced pressure leaves a residue of the 5'-trityl derivative in the form of a glass which may be used directly in the next step of our process.

In the second step, the 5'-trityl derivative is converted to a dibenzylphosphate by reaction with dibenzylchlorophosphonate. We have found that this process is most readily accomplished by reacting the 5'-trityl compound in solution in a tertiary organic base, such as pyridine and the like, with a solution of dibenzylchlorophosphonate in an inert organic solvent (inter alia carbon tetrachloride, chloroform, and the like) at a low temperature. We have obtained excellent yields of the desired product by maintaining the temperature of the reaction mixture at about $-30°$ C. to $-50°$ C. for about 5½ hours and then permitting the mixture to stand at room temperature for about 15 hours to complete the reaction. While the resulting dibenzylphosphate derivative can be recovered from the reaction mixture by various alternative procedures, we prefer to neutralize the reaction mixture with an alkali, such as sodium carbonate, and then freeze-dry the product to remove the volatile constituents. The residue so obtained is further purified by dissolving it in an organic solvent, such as chloroform, and washing the resulting solution successively with an aqueous solution of a weak base, such as sodium bicarbonate, water, and a dilute mineral acid, such as dilute hydrochloric acid. After these washing steps, the resulting solution is then evaporated to dryness, producing a residue of the dibenzylphosphate of 1-(5'-trityl-α-D-ribofuranosido)-5,6-dimethylbenzimidazole, which is usually in the form of a glass at this point.

In the final step of our preferred process, the dibenzylphospate of 1-(5'-trityl-α-D-ribofuranosido)-5,6-dimetyhlbenzimidazole is reacted with hydrogen in the presence of a hydrogenation catalyst. This step is conveniently effected by dissolving the intermediate product in a solvent containing a few drops of hydrochloric acid, adding a hydrogenation catalyst and treating the mixture with hydrogen under superatmospheric presesure. We prefer to use a palladium-charcoal catalyst for carrying out this reaction although platinum is equally satisfactory for this purpose. After the required amount of hydrogen has been absorbed, the solution contains the phosphate of 1-(α-D-ribofuranosido)-5,6-dimethylbenzimidazole which may be recovered by precipitating this product in the form of its lead salt by the addition of a soluble lead salt, such as lead acetate. The separated lead salt is then suspended in water and treated with hydrogen sulfide to regenerate the desired free phosphate derivative. After removing the insoluble lead sulfide, the phosphate derivative may be recovered by evaporating the aqueous solution to dryness under diminished pressure, or by precipitating the product from the aqueous solution by the addition of acetone. We have found it very convenient to recover the desired product in the form of a crystalline dibrucine salt which may be obtained by adding a solution of brucine in a water miscible solvent, such as methanol, to an aqueous solution of the phosphate followed by evaporation of the methanol. The crystalline dibrucine salt so obtained has a melting point of 169–173° C.

The phosphate of 1-(α-D-ribofuranosido)-5,6-dimethylbenzimidazole may be recovered from the dibrucine salt by dissolving the salt in water, adding sufficient ammonium hydroxide to make the solution alkaline, extracting the brucine with chloroform, and precipitating the phosphate of 1-(α-D-ribofurnaosido)-5,6-dimethylbenzimidazole as the lead salt by the addition of lead acetate to the aqueous solution. The free phosphate may be recovered from the lead salt by suspending the latter compound in water, saturating the suspension with hydrogen sulfide, removing the precipitated lead sulfide, and evaporating the resulting aqueous solution to dryness in vacuo. The phosphate of 1-(α-D-ribofuranosido)-5,6-dimethylbenzimidazole which is obtained as a clear, oily residue by this process is dissolved in water and precipitated as a solid by the addition of acetone.

The phosphate of 1-(α-D-ribofuranosido)-5,6-dimethylbenzimidazole so obtained is a white, amorphous, hygroscopic solid which is very soluble in water but insoluble in acetone. In 0.1 N hydrochloric acid solution the absorption spectrum showed maxima at approximately 2770 Å. and 2850 Å. In aqueous solution it is acidic and readily forms salts with organic and inorganic bases.

The following examples illustrate methods of carrying out the present invention but it is to be understood that these examples are given by way of illustration and not of limitation.

EXAMPLE 1

*Preparation of 1-(5'-trityl-α-D-ribofuranosido)-5,6-dimethylbenzimidazole*

All apparatus, reagents and solvents used in the beginning of this reaction were carefully dried. A solution of 0.50 gm. of 1-(α-D-ribofuranosido)-5,6-dimethylbenzimidazole and 0.55 gm. of triphenylchloromethane in 6 ml. of pyridine was allowed to stand for about 17 hours at room temperature, and then heated in an oil bath at 100° C. for three hours. The solution was poured into 50 ml. of water with stirring. The supernatant liquid was decanted from the precipitated gum and centrifuged. The aqueous solution was decanted from an oil which separated. Both oil and gum were washed with water and then combined in an acetone solution which was subsequently concentrated to dryness. Pyridine was removed from the residue by two extractions with hot water. The residue was dissolved in 10 ml. of equal parts by volume of acetone and ethanol. The solution was heated with activated charcoal, filtered, concentrated to dryness, and traces of moisture were removed from the residue by two distillations with an absolute ethanol-benzene mixture. Further drying at low pressure yielded 1-(5'-trityl-α-D-ribofuranosido)-5,6-dimethylbenzimidazole as a glass weighing 0.85 gm.

*Preparation of the phosphate of 1-(α-D-ribofuranosido)-5,6-dimethylbenzimidazole*

A solution of dibenzylchlorophosphonate, prepared from 1.28 gm. of dibenzyl phosphite, in 8.5 ml. of dry carbon tetrachloride was cooled to −20° C., and added under anhydrous conditions to a solution of 0.71 gm. of 1-(5'-trityl-α-D-ribofuranosido)-5,6-dimethylbenzimidazole in 9 ml. of dry pyridine, cooled to −50°

C. The solution was maintained at −30° C. to −50° C. for about 5½ hours and then at room temperature for about 16 hours. At the end of this time two layers were present, and the mixture was stirred mechanically for about ½ hour. While cooling in an ice bath, the mixture was treated with 3.5 ml. of water and 0.68 gm. of sodium carbonate. The solvents were removed by freeze-drying. The residue was taken up in chloroform and water, and the chloroform layer was washed successively with excess sodium bicarbonate solution, twice with water, with dilute hydrochloric acid solution, and finally four times with water. After drying over sodium sulfate, the chloroform solution was filtered and evaporated to dryness, leaving a glassy residue weighing 1.15 gm. and consisting of the dibenzyl phosphate of 1-(5'-trityl-α-D-ribofuranosido)-5,6-dimethylbenzimidazole. A mixture of this material, 20 ml. of absolute ethanol, 2 drops of 6 N hydrochloric acid, 0.5 gm. of palladium oxide catalyst and 0.5 gm. of palladium on charcoal catalyst was shaken for 18 hours under hydrogen at 40 p. s. i. pressure. After removing the catalyst by filtration, the lead salt of the phosphate of 1-(α-D-ribofuranosido)-5,6-dimethylbenzimidazole was precipitated by the addition of an aqueous solution of lead acetate. The lead salt was separated and decomposed with hydrogen sulfide. After removal of the precipitated lead sulfide and excess hydrogen sulfide, the solution was neutralized with a methanol solution of brucine. Evaporation of the methanol effected the crystallization of the dibrucine salt of the phosphate of 1-(α-D-ribofuranosido)-5,6-dimethylbenzimidazole. The weight of salt was 130 mg., and it had a melting point of 169–173° C.

Anal. Calc'd. for $C_{14}H_{19}O_7N_2P \cdot 2C_{23}H_{26}O_4N_2$: C, 62.81; H, 6.24; N, 7.33; P, 2.71. Found: C, 62.66; H, 6.34; N, 7.31; P, 2.46.

EXAMPLE 2

A solution of 20.3 mg. of the dibrucine salt of the phosphate of 1-(α-D-ribofuranosido)-5,6-dimethylbenzimidazole in 0.5 ml. of water was made alkaline with three drops of concentrated ammonium hydroxide. The solution was extracted with three 0.5 ml. portions of chloroform to remove the brucine. The aqueous layer was warmed to remove chloroform, and was then diluted with 0.5 ml. of methanol. The solution was made acid with 4 drops of glacial acetic acid and a 25% aqueous solution of lead acetate was added in a dropwise manner until there was no further precipitation of lead salt. The lead salt was removed by centrifugation and washed with methanol. Then the lead salt was suspended in 0.5 ml. of hot water and saturated with hydrogen sulfide. The lead sulfide precipitate was centrifuged and the supernatant liquor was filtered. The filtrate was aerated with nitrogen and then concentrated to dryness in vacuo. The clear oily residue was dissolved in 0.1 ml. of water and 1 ml. of acetone was added to precipitate the phosphate of 1-(α-D-ribofuranosido)-5,6-dimethylbenzimidazole. The crude product was purified by dissolving in water and reprecipitating with acetone. The phosphate of 1-(α-D-ribofuranosido)-5,6-dimethylbenzimidazole is a white, amorphous, hygroscopic solid.

In 0.1 N hydrochloric acid solution, the absorption spectrum showed maxima at approximately 2770 Å. and 2850 Å.

Various changes and modifications may be made in carrying out the present invention without departing from the spirit and scope thereof. Insofar as these changes and modifications are within the purview of the annexed claims, they are to be considered as part of our invention.

We claim:

1-(5'-trityl-α-D-ribofuranosido)-5,6-dimethylbenzimidazole dibenzylphosphate.

DOROTHEA HEYL HOFFMAN.
CLIFFORD H. SHUNK.
KARL FOLKERS.

References Cited in the file of this patent

UNITED STATES PATENTS

| Number | Name | Date |
|---|---|---|
| 2,522,854 | Brink et al. | Sept. 19, 1950 |

OTHER REFERENCES

Baddiley et al., J. Chem. Soc., pages 648–651 (1947).

Brederick et al., Berichte der Deutsche Chem., pages 269–273 (1940).

Atherton et al., Jour. Chem. Soc., pages 382–385 (1945).